UNITED STATES PATENT OFFICE.

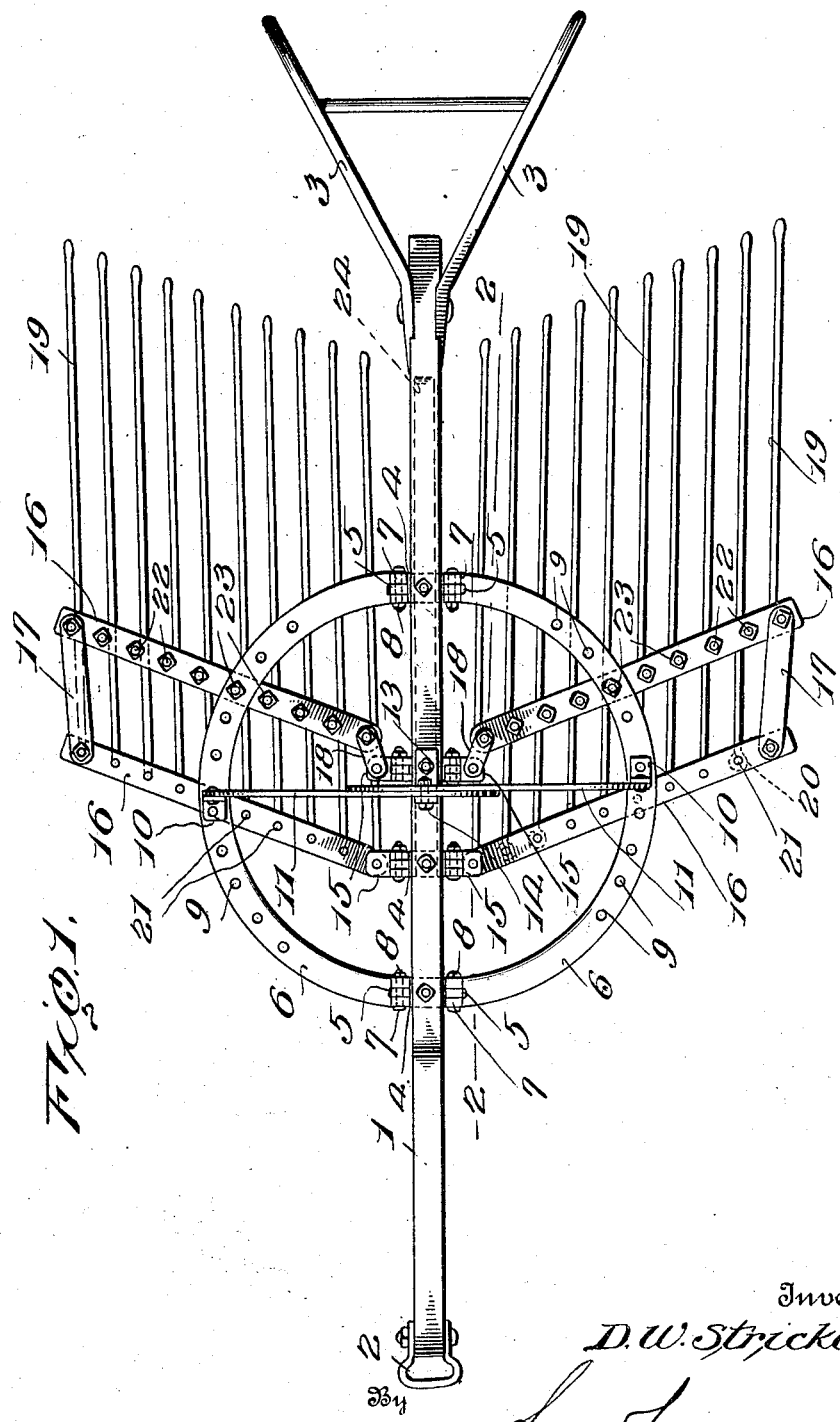

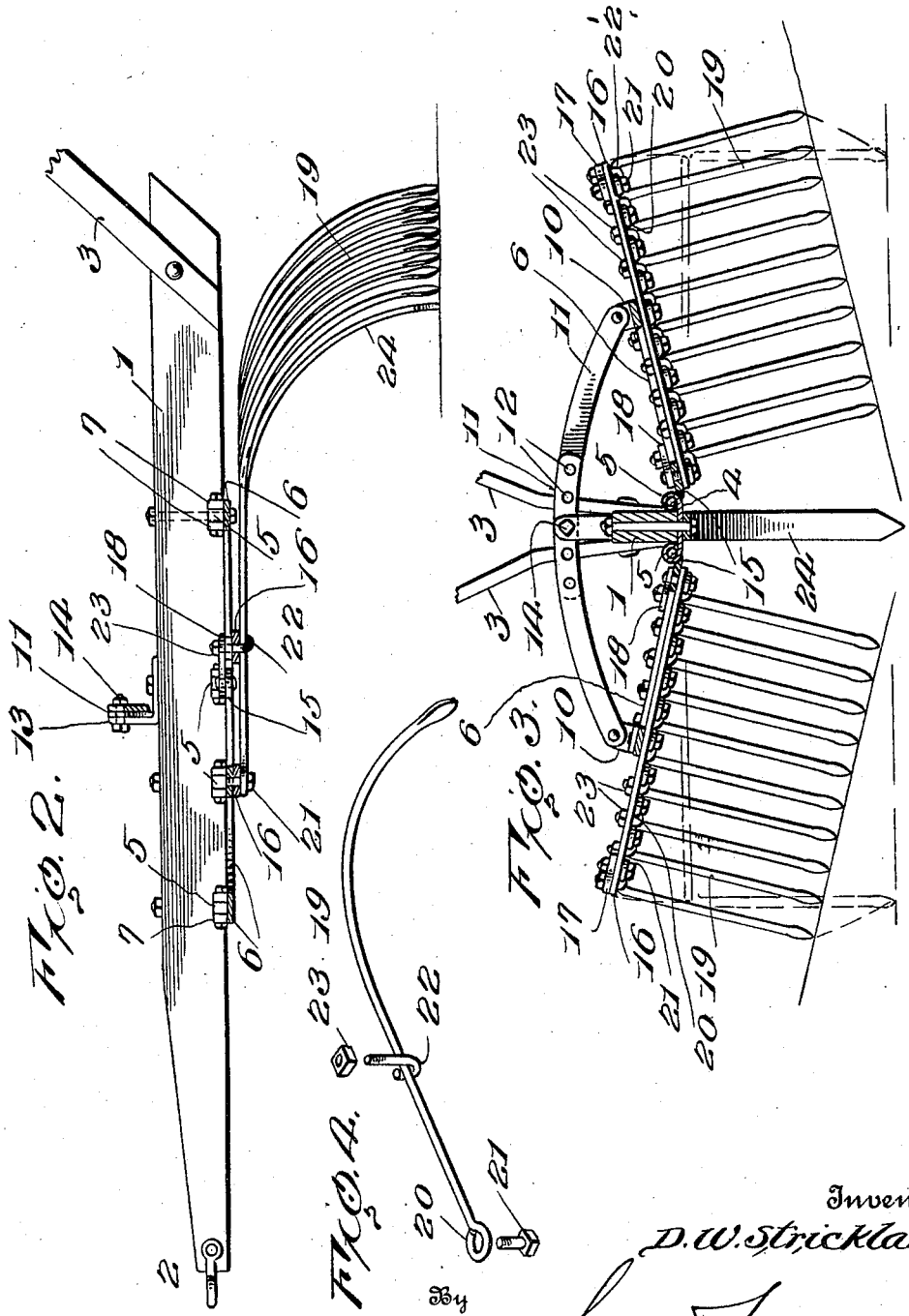

DE WITT W. STRICKLAND, OF TYLERTOWN, MISSISSIPPI.

CULTIVATOR.

1,310,095.   Specification of Letters Patent.   Patented July 15, 1919.

Application filed July 11, 1918. Serial No. 244,437.

*To all whom it may concern:*

Be it known that I, DE WITT W. STRICKLAND, a citizen of the United States, residing at Tylertown, in the county of Pike and State of Mississippi, have invented certain new and useful Improvements in Cultivators, of which the following is a specification.

My invention relates to agricultural implements and has special reference to cultivators and harrows, the object being to provide an implement of simple and inexpensive construction in which the teeth or blades may be easily and quickly adjusted so as to work upon a level field or to conform to the ridges or rows in which plants may be growing. A further object of the invention is to provide a construction which will permit the blades or teeth to be adjusted so as to be disposed in a line at a right angle to the draft beam or tongue or to extend obliquely forwardly or rearwardly. Other incidental objects of the invention will appear in the course of the following description and the invention resides in certain novel features which will be particularly pointed out in the appended claims.

The invention is fully illustrated in the accompanying drawings, in which—

Figure 1 is a plan view of an implement embodying my improvements;

Fig. 2 is a longitudinal section on the line 2—2 of Fig. 1;

Fig. 3 is a transverse section showing the implement adjusted to work between elevated rows.

Fig. 4 is a detail perspective view of one of the teeth.

In carrying out my invention, I employ a draft beam or tongue 1 which is equipped at its front end with a clevis 2 for the attachment of draft devices and at its rear end with handles 3 of any well-known or preferred form whereby the implement may be steered. To the under side of the tongue or draft beam at about the center thereof and in advance and in rear of the center, I secure a plurality of base plates or brackets 4 which are provided at their ends with hinge eyes 5. I also employ approximately semi-circular supporting bars or members 6 which are equipped at their ends with hinge eyes 7 adapted to aline with the hinge eyes 5 on the brackets 4 and pintles 8 are inserted through the said registering eyes so as to hingedly connect the supporting bars 6 to said brackets or base plates. The supporting bars 6 are provided with series of openings 9 for a purpose which will presently appear and midway the ends of said bars I secure upon the upper sides of the same the lugs or brackets 10 to which the outer ends of braces 11 are pivotally attached. The said braces 11 are curved and extend inwardly over the draft beam or tongue with their inner ends overlapping and the said inner ends of the braces are provided with openings 12 which are adapted to register with an opening in the upper end of a locking lug 13 secured upon the top of the beam to receive a pin or bolt 14 whereby the braces will be held in an adjusted position and the supporting bars 6 secured in any position in which they may be set. The bracket or lug 13 may be secured to the draft beam or tongue by the same bolt which secures one of the inner base plates or brackets 4 thereto and to the ends of the said inner brackets or base plates 4, I secure the lugs 15 in the same manner that the bars 6 are connected to the front and rear base plates. The cultivator or harrow beams 16 are preferably flat bars which have their inner ends pivotally attached to the lugs 15 and have their outer ends connected by links 17, the extremities of which are pivoted to the ends of the harrow beams whereby the said beams will be maintained in parallel relation in all their adjusted positions. In the illustrated arrangement the inner ends of the rear beams 16 are connected with the brackets or lugs 15 by short links 18, this arrangement permitting the beams 16 to be spaced a slightly greater distance apart and thereby furnishing a firmer support for the harrow or cultivator teeth 19 while permitting the lugs or brackets 15 to be brought nearer the center of the support consisting of the bars 6. The provision of these links 18 also permits the harrow or cultivator teeth to be swung closer to the draft beam and thereby swung more closely together so that a very great economy of space may be effected in storing the device in a barn. As the forward beam 16 swings rearwardly it will obviously, at an extreme position, tend to bear against the lug 15 to which the rear beam 16 is connected and if the connection between the said rear beam and the rear lug was direct the beams would come into contact while the cultivator or harrow teeth were yet spaced a considerable distance apart, but the links 18 swinging rearwardly toward the draft beam will carry the inner end of the rear beam 16 toward the draft beam in rear of the lug 15 to which said link is attached so that the rearward inward swinging movement of the front beam may be carried farther than would otherwise be possible. The harrow or cultivator teeth are preferably spring teeth having their forward portions disposed substantially parallel with and below the plane of the supporting bars 6 and the beams 16 to which are attached and the forward extremities of the teeth are constructed with eyes 20 adapted to pivotally engage pins or bolts 21 inserted in and secured to the foremost beam 16 at regular intervals. To the rear beam 16, I secure the supporting hooks or guides 22 which engage under the forward portions of the harrow or cultivator teeth and thereby support the same, one of the guiding hooks 22 being passed through one of the openings 9 in the adjacent supporting bar 6 so that the said beams will be secured in any desired position relative to the said supporting bars. While I prefer to use spring teeth of the form illustrated in the accompanying drawings, it will be understood that this particular form is not essential and any desired type of cultivator or harrow tooth may be employed.

The implement is drawn over the field in the usual manner and the teeth or blades will take into the surface of the soil and pulverize the same as will be readily understood. In Figs. 1 and 2, I have illustrated the teeth as disposed in horizontal planes at both sides of the draft beam or tongue so that the implement will pulverize the soil and make the same level. It will also be noted that in Fig. 1 the several teeth are disposed parallel with the draft beam or tongue, but the series of teeth are disposed obliquely relative to the draft beam with the innermost teeth in advance of the outer teeth. This arrangement will cause stones and large hard clods of earth to be worked to the sides of the path of the implement where they may be subsequently gathered and removed. By loosening the nuts 23 which secure the guide hooks 22 to the adjacent supporting bar 6 the beams 16 may be swung forwardly or backwardly about their pivotal connections with the lugs or brackets 15 and the series of teeth brought into lines at right angles to the draft beam or extending obliquely forward and this facility of adjustment permits the teeth to be set so as to meet the demands of any particular work or suit the individual wishes of any particular operator. The supporting bars 6 may be swung in vertical planes about their pivotal connections with the front and rear brackets or base plates 4 so that the harrow teeth may be set to work upon the sides of a row of hills and throw the loose surface soil up about the stems of plants or may be set so that the beam will ride along the ridge and the teeth cut the loose soil from the ridge of the row and reduce the irregularities of level between the ridge and the trough between adjacent ridges, this adaptability of the implement being an important and advantageous feature. In order that the soil on the ridge or that at the bottom of the trough or ditch may be pulverized, I secure to the under sides of the intermediate base plates 4 a single tooth 24 which is disposed longitudinally of the tongue and will take into the soil at the top of the ridge or in the base of the ditch and thereby aid in steering the implement.

It will be readily seen from the foregoing description, taken in connection with the accompanying drawings, that I have provided an exceedingly simple agricultural implement in which the members which engage the ground may be adjusted universally so as to be brought into any desired position and thereby made to conform to any pecularities of the surface over which the implement is drawn. The various adjustments may be easily effected by an unskilled person and the weight of the implement is not materially increased over less efficient implements now in use.

Having thus described my invention, what is claimed as new is:

1. An agricultural implement comprising a draft beam, arcuate supporting bars hinged at their ends to the draft beam for movement in vertical planes, arcuate braces hinged at their outer ends to the said supporting bars and having their inner ends extending over the draft beam, means for adjustably securing the inner portions of said braces, cultivator beams attached at their inner ends to the draft beam for movement in horizontal and vertical planes, means for adjustably securing said beams to the arcuate supporting bars, means for maintaining said cultivator beams in parallel relation at each side of the draft beam, and ground-engaging members carried by said cultivator beams.

2. An agricultural implement comprising a draft beam, a plurality of brackets secured rigidly to said beam and having their ends disposed laterally beyond the beam and provided with hinge eyes, arcuate supporting bars hinged at their ends to said eyes on the foremost and rearmost brackets, lugs hinged to the eyes on the inner brackets for movement in a vertical plane, arcuate braces hinged at their outer ends to the arcuate supporting bars at the centers of the same and extending inwardly over the draft beam and having their ends disposed in overlapped relation, means for adjustably securing the inner overlapped ends of said braces together, links pivoted at their inner ends to the rearmost of said pivoted lugs, cultivator beams pivoted at their inner ends to the foremost of said pivoted lugs, other cultivator beams pivoted at their inner ends to the outer rear ends of said links, link connections between the outer ends of said beams, and cultivator teeth carried by said cultivator beams.

3. An agricultural implement comprising a draft beam, arcuate supporting bars hinged at their ends to the sides of the draft beam for movement in a vertical plane, plate secured rigidly to the draft beam between the ends of the supporting bars and projecting beyond the sides of the draft beam, lugs hinged to the ends of said plates for movement in a vertical plane and extending outwardly therefrom, cultivator beams pivoted at their inner ends to said lugs for movement in a horizontal plane, means for maintaining said beams in parallel relation, ground-engaging implements carried by said beams, means for adjustably securing said beams to the supporting bars, arcuate braces hinged at their outer ends to the arcuate supporting bars and having their inner portions extending over the draft beam in overlapped relation, and means on the beam to engage the overlapping portions of the braces and secure them in a set position.

In testimony whereof I affix my signature.

DE WITT W. STRICKLAND. [L. S.]

Copies of this patent may be obtained for five cents each, by addressing the "Commissioner of Patents, Washington, D. C."